US006906734B2

(12) United States Patent
Subramanian et al.

(10) Patent No.: US 6,906,734 B2
(45) Date of Patent: Jun. 14, 2005

(54) METHOD, SYSTEM AND STORAGE MEDIUM FOR DISPLAYING COMMUNICATION NETWORK CONNECTIONS

(75) Inventors: Mahesh Subramanian, San Jose, CA (US); Suresh Muthu, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 69 days.

(21) Appl. No.: 10/284,669

(22) Filed: Oct. 31, 2002

(65) Prior Publication Data

US 2004/0085346 A1 May 6, 2004

(51) Int. Cl.[7] .......................... G06F 3/14; G06F 15/177
(52) U.S. Cl. ...................... 345/736; 345/735; 345/734; 345/737; 345/784; 345/786; 709/223; 709/224; 709/226
(58) Field of Search ................................ 345/736, 969, 345/735, 734, 737–740, 771, 773, 970, 966, 786, 784, 817, 818, 825, 828, 830; 709/223, 224, 226, 225, 227, 229, 238, 244; 715/503

(56) References Cited

U.S. PATENT DOCUMENTS

| 5,276,789 | A | * | 1/1994 | Besaw et al. ............ 345/969 X |
| 5,819,042 | A | * | 10/1998 | Hansen .................... 709/223 X |
| 6,020,889 | A | * | 2/2000 | Tarbox et al. .............. 345/736 |
| 6,040,834 | A | * | 3/2000 | Jain et al. ............... 345/969 X |
| 6,370,154 | B1 | * | 4/2002 | Wickham ............... 709/223 X |
| 6,411,967 | B1 | * | 6/2002 | Van Renesse ........... 709/223 X |

OTHER PUBLICATIONS

Notification of Transmittal of The International Search Report dated Mar. 12, 2004 for PCT/US03/32828.
International Search Report for PCT/US03/32828.

* cited by examiner

Primary Examiner—Raymond J. Bayerl
(74) Attorney, Agent, or Firm—Michael R. Cammarata; David A. Fox

(57) ABSTRACT

A user interface for managing connections across multiple cross connects of a communication network. The user interface provides for creating, viewing and removing connections in the cross connect. The user interface displays the relative position of cross connects along the communication network. Time slots for communicating ports are adjacently displayed so that mis-configured connections may be easily recognized.

24 Claims, 7 Drawing Sheets

METHOD, SYSTEM AND STORAGE MEDIUM FOR DISPLAYING COMMUNICATION NETWORK CONNECTIONS

BACKGROUND OF THE INVENTION

1. Field of Invention

The invention relates generally to user interfaces and in particular to a user interface for interacting with a network cross connect.

2. Description of Related Art

Optical communication networks utilize a variety of network elements to transmit information from sender to receiver. One such network element is a cross connect which essentially serves as a switch for establishing paths along the network. Through a user interface, the cross connect allows a user to create connections, analyze connections and remove connections.

Many communication networks carry time divisions multiplexed (TDM) signals in which signals are assigned to one or more time slots. Exemplary TDM transmission formations include SONET and SDH. In TDM transmissions, in order for a signal to be communicated between two network elements, both network elements must have the same time slots allocated for this signal. By contrast, within a network element, time slot interchange may occur between ports such that the time slots allocated to the signal change within a network element.

The need for consistent time slot allocation between network elements causes difficulties in establishing or troubleshooting connections. To provision a connection around a ring of four network elements, for example, the operator needs to know the order of the network elements in the ring and the time slots to be associated with the connection at each network element. Given current data rates at the OC-192 level and higher, this translates into managing 192 time slots or more across four network elements, with the possible inclusion of time slot interchange within one or more network elements. This high number of time slots makes it burdensome to create, remove, troubleshoot and otherwise manage connections that extend along multiple cross connects.

BRIEF DESCRIPTION OF THE DRAWINGS

Embodiments of the present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of embodiments of the invention refers to the accompanying drawings. The same reference numbers in different drawings identify the same or similar elements. Also, the following detailed description does not limit the invention. Instead, the scope of the invention is defined by the appended claims and equivalents thereof.

The invention may be used in a variety of communication networks, including electrical and optical networks. The expression "communicates" as used herein refers to any connection, coupling, link or the like by which signals carried by one system element are imparted to the "communicating" element. Such "communicating" devices are not necessarily directly connected to one another and may be separated by intermediate components or devices. Likewise, the expressions "connected" and "coupled" as used herein are relative terms and do not require a direct physical connection.

Figure 1:
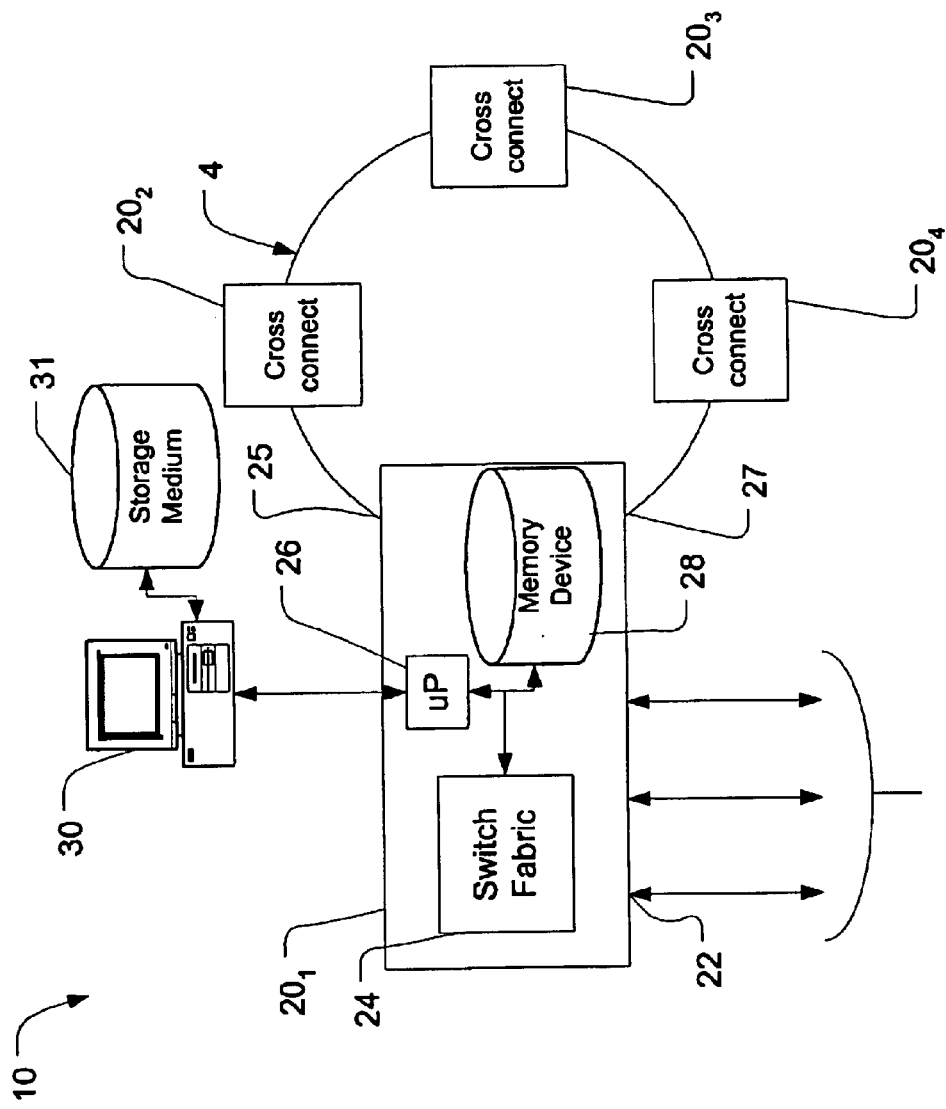
FIG. 1 is a block diagram of an exemplary communication network.

FIG. 1 is a block diagram of an exemplary communication network 10 including a cross connects $20_1$–$20_4$ having bi-directional east ports 25 and west ports 27 for directing signals around ring 4. A switch fabric 24 provides for interconnection between ports 25 and 27. A processor 26 is used to control the switch fabric and a memory device 28 stores information concerning connections between ports as described in further detail herein. In the example shown in FIG. 1, the cross connects 20 carry traffic around the network ring referred to as line connections. Cross connects 20 may also include an add/drop multiplexer to provide for adding or dropping tributary connections 6 to and from the ring 4 at ports 22.

The ring 4 may include further network elements such as optical amplifiers, OADMs, other cross connects, etc. Furthermore, cross connect 20 may provide cross connections between segments of a linear network, between different network rings, and may even be part of a mesh network and cross connect multiple network segments and otherwise serve as an N-degree node. In other words, cross connect 20 and the cross connections displayed by the invention are not limited to the ring cross connects illustrated in the example of FIG. 1.

An embodiment of the invention is a user interface that allows a user to create, view and remove connections across cross connects 20. The user interface may be implemented by a user interface application executed by a user system 30 coupled to one or more cross connects 20 through processor 26. The user system 30 may be a general-purpose computer executing the user interface application stored in a storage medium 31 accessible by user system 30. The user system 30 includes suitable input devices (e.g., keyboard, mouse) and a graphical display device (e.g., CRT).

User system 30 may be a craft terminal that connects directly to a cross connect 20 (e.g., RS232 connection). Alternatively, the user system 30 may access cross connects 20 over one or more networks such as an overlay IP network. Thus, the user system 30 may interface with more than one cross connect 20 at a time. When the user system 30 contacts a cross connect 20, the contents of memory device 28 may be synchronized with storage medium 31 using conventional database synchronization techniques. This allows the user system 30 to perform display and search operations without repeatedly accessing cross connect 20.

The user system 30 executes a user interface application that allows a user to create, view and remove connections across one or more cross connects 20. Connections may be created and removed using graphical input techniques (e.g., drag and drop). Cross connects 20 store a list of all connections around the ring 4 in a memory device 28. This list may be created and updated using neighbor discovery techniques where each cross connect 20 communicates with adjacent cross connects to build a map of connections around ring 4. When the user system 30 contacts a cross connect 20, the contents of memory device 28 are copied to storage medium 31. As connections are added and/or removed, memory device 28 and storage medium 31 may be refreshed accordingly.

Figure 2:
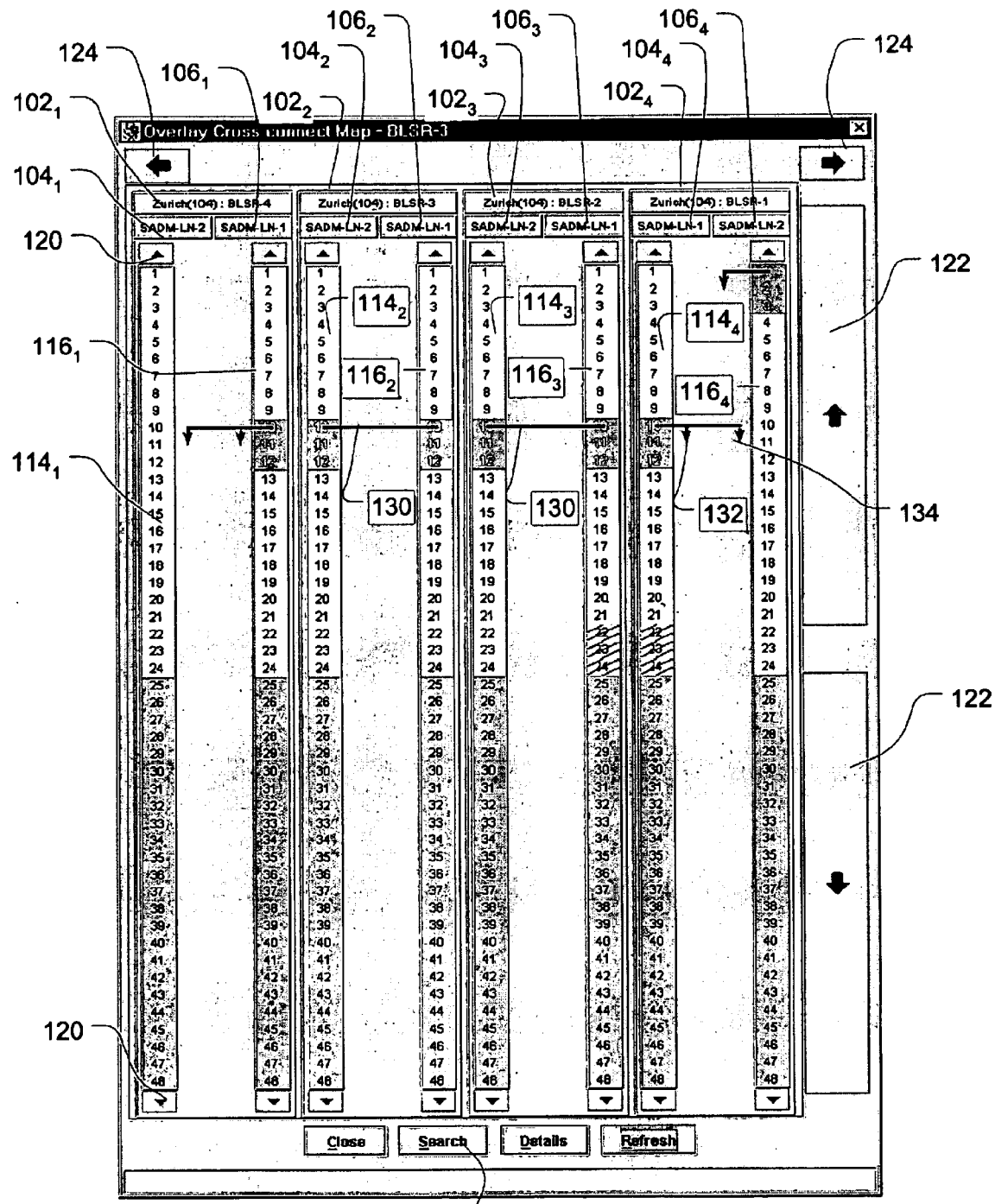
FIG. 2 depicts an exemplary user interface illustrating correct connections between network elements.

The user system 30 preferably generates the user interface based on data in memory device 31. This reduces the burden on cross connect 20 in responding to queries from user system 30. FIG. 2 depicts an exemplary user interface generated at user system 30. The user interface provides information concerning a path across multiple cross connects 20 to facilitate creation and troubleshooting of end-to-end connections.

The user interface of FIG. 2 includes cross connect identifiers 102 that identify the cross connects $20_1$–$20_4$ using a numeric or alphanumeric designator. The cross connect identifiers 102 also provide the relative positioning of the cross connects 20 around the ring 4. In other words, the cross connect identifiers $102_1$–$102_4$ represent that cross connect $20_1$ is in communication with cross connect $20_2$ which is in communication with cross connect $20_3$, etc. This provides the user with a representation of the cross connects that need to be provisioned to establish a connection from cross connect $20_1$ to cross connect $20_4$.

Beneath the cross connect identifiers 102 are east port identifiers 104 and west port identifiers 106 that identify the cross connect ports using a numeric or alphanumeric designator. The east port identifiers 104 and west port identifiers 106 also provide the relative position of ports around the ring 4. In other words, the west port $106_1$ is in communication with east port $104_2$, etc. This provides the user with a representation of which ports require consistent time slot allocation in order to continue a connection around the ring.

Beneath the east port identifier 104 is a listing of the east port time slots 114 and beneath the west port identifier 106 is a listing of west port time slots 116. As described in further detail herein, the east port time slots 114 and west port time slots 116 may be displayed in different formats and/or relative positions so that a user can easily create and subsequently manage connections around the communication network.

Associated with the east port time slots 114 and the west port time slots 116 are scroll buttons 120 that allow an individual set of times slots to be scrolled. In the exemplary embodiment in FIG. 2, time slots 1–48 are shown for each port. Each port may carry, for example, 192 time slots. Thus, the scroll buttons 120 are used to change the time slots appearing in the user interface for a single port. Consolidated scroll buttons 122 allow a user to scroll all time slots for all ports simultaneously. A Rotation button 124 click would shift the cross connect view one position to the left or right. The horizontal scroll bar would bring additional cross connects into view if not already showing This allows the user to specify the originating and terminating cross connect. Thus, the user can view connections completely around the ring 4.

The user interface presents time slots and connections in a graphical format such that provisioning and troubleshooting connections around the communication network is facilitated. Working time slots available for establishing line connections around ring 4 may be shown in a first graphical format (e.g., colored, shaded or textured). For example, time slots 1–24 on east port time slots $114_1$ are depicted white indicating that these time slots are available for line connections. Time slots 25–48 on east port time slots $114_1$ are depicted in a second graphical format (e.g., colored, shaded or textured) to indicate that the time slots are reserved for protection connections. Time slots 22–24 of west port time slots $116_3$ and east port time slots $114_4$ are depicted in a third graphical format (e.g., colored, shaded or textured) to indicate that the time slots are designated for carrying enhanced, non-preemptible, unprotected traffic (ENUT).

Line connections, protection connections and tributary connections are all represented in the user interface. Time slots designated for a line connection are depicted in a fourth graphical format (e.g., colored, shaded or textured). A connection between two cross connects is represented by one or more west port time slots on a first cross connect and corresponding east port time slots on an adjacent second cross connect having the fourth graphical format. For example, in FIG. 2, time slots 10–12 of west port time slots $116_2$ and time slots 10–12 of east port time slots $114_3$ are commonly shaded. This indicates a line connection between cross connects $20_2$ and $20_3$ on time slots 10–12. A pass through connection extending from an east port to a west port on the same cross connect is represented with a pass through connection line 130. The cross connects may allow time slot interchanging, in which case the pass through connection line 130 may extend between differing groups of time slots.

A tributary connection (also referred to as an add-drop connection) is represented graphically, for example, with a tributary connection designator 132. Absent another designator, it is assumed that the tributary connection is unprotected. It is understood that other graphical and/or alphanumeric indicators may be used to designate a tributary connection. The tributary connection may be implemented using an add/drop multiplexer. In the example shown in FIG. 2, cross connect $20_1$ and cross connect $20_4$ include add/drop multiplexers to provide tributary connections to ring 4.

A protection connection providing protection for a tributary connection is represented graphically, for example, with a protection connection designator 134 adjacent to tributary connection designator 132. It is understood that other graphical and/or alphanumeric indicators may be used to designate a protection connection. The protection connection may also be implemented using an add/drop multiplexer and provide a protection path in the event the tributary connection is unavailable. In the example shown in FIG. 2, cross connect $20_1$ and cross connect $20_4$ include add/drop multiplexers to access the protection connections.

Figure 3:
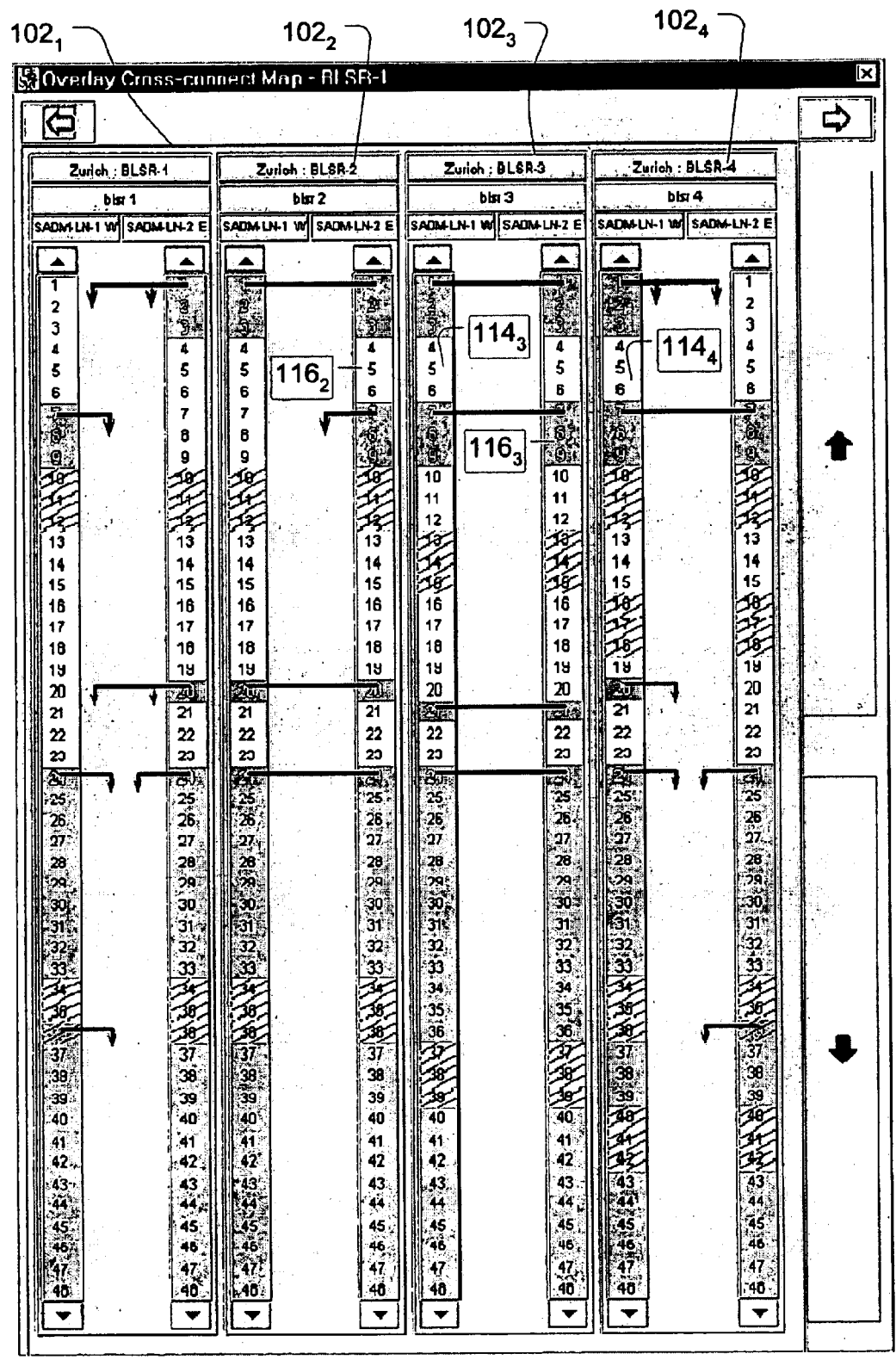
FIG. 3 depicts an exemplary user interface illustrating incorrect connections between network elements.

The user interface of FIG. 2 allows for efficient and rapid recognition of proper connections around ring 4. For example, proper line connections between cross connects are represented by corresponding adjacent time slots having the fourth graphical format. The user interface in FIG. 3 includes a line connection that is not configured properly that is readily apparent as time slot 20 of west port time slots $116_2$ being misaligned with time slot 21 of east port time slots $114_3$. Similarly, time slot 21 of west port time slots $116_3$ is not aligned with time slot 20 of east port time slots $114_4$. Thus, the line connection from cross connect $20_1$ to cross connect $20_4$ is interrupted. Similarly, the ENUT configuration on time slots 10–12 of cross connect $20_1$ to cross connect $20_4$ is interrupted at cross connect $20_3$ due to a time slot mismatch.

Figure 4:
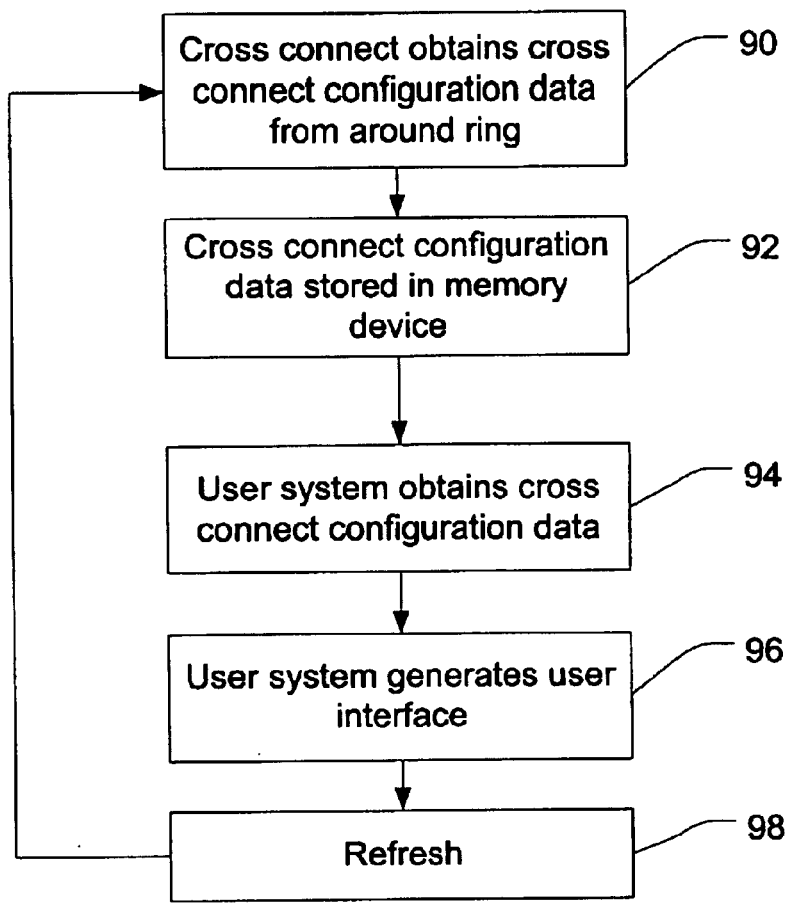
FIG. 4 is a flowchart of an exemplary process for generating the user interface.

FIG. 4 is a flowchart of an exemplary process for generating the user interface. The process begins at step 90 where a cross connect 20 obtains cross connect configuration data from other cross connects around the ring 4. This process may be performed using existing neighbor discovery techniques. The cross connects may pass a data object around the ring 4 and each cross connect 20 stores cross connect configuration data to the data object. As described in further detail herein, the cross connect configuration data includes information about connections in each cross connection, the time slots used, the types of connections etc. The cross connect configuration data is stored in memory device 28 at step 92. Preferably, each cross connect 20 stores a copy of the cross connect configuration data. At step 94, the user system 30 requests the cross connect configuration data from a cross connect 20 and the contents of memory device 28 are copied to storage medium 31.

At step 96, the user system 30 generates the user interface based on the cross connect configuration data. This includes adjusting the user interface in response to user selection of scroll buttons 120, consolidated scroll buttons 122 or rotation buttons 124. At step 98, the cross connect configuration data may be refreshed by repeating the process. The refresh may automatically, periodically occur or may be initiated in response to a user command.

Figure 5:
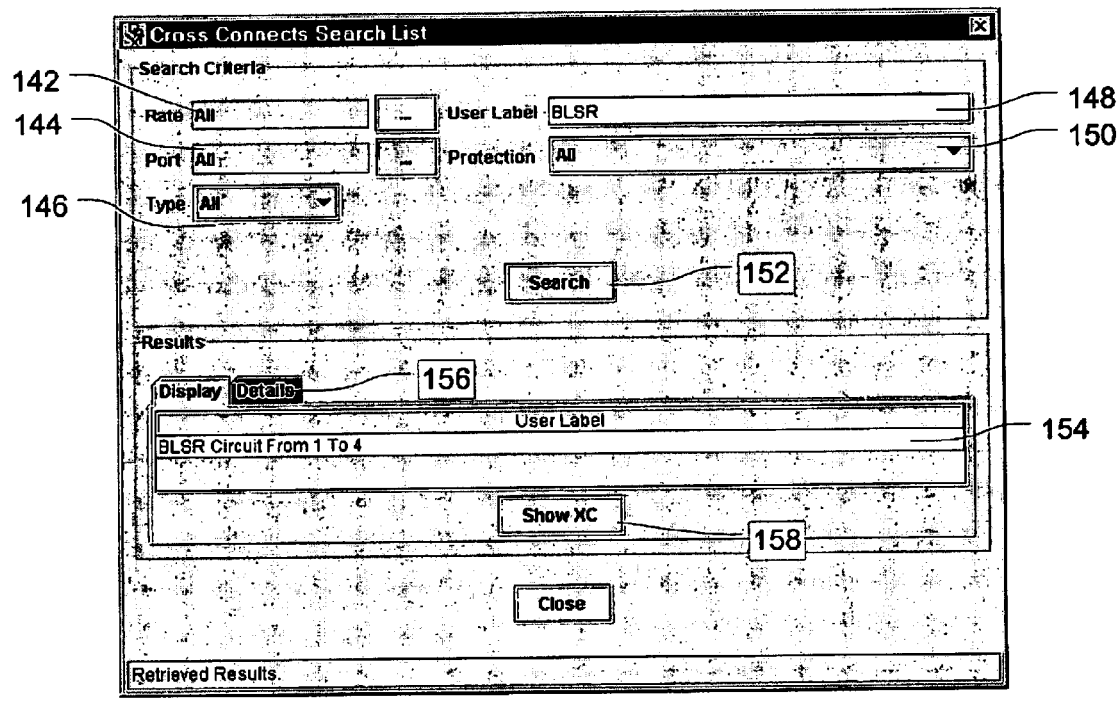
FIG. 5 depicts an exemplary cross connection search interface.

The user system 30 provides search tools for retrieving information about connections. A connection search is implemented when the user selects a search icon 140 (FIG. 2). FIG. 5 depicts an exemplary cross connect search interface presented on user system 30. The connection search interface includes a number of search fields that allow a user to specify one or more search criteria. A rate search field 142 allows a user to search for cross connections based on data rate. The rate search field 142 may be associated with a drop down menu that allows a user to select rates from a predefined list. A port search field 144 allows a user to search for cross connections based on port identifiers. The port search field 144 may be associated with a drop down menu that allows a user to select port identifiers from a predefined list. The port identifiers may be assigned by users when ports are provisioned, altered, etc.

A connection type search field 146 allows a user to search for cross connections based on the type of connection. Connections may be provisioned as pass through, tributary, or protected tributary. Some systems also support a loop back or hairpin connection where the connection is between two sets of timeslots within the same port. The connection type search field 146 may be associated with a drop down menu that allows a user to select connection types from a predefined list.

A connection label search field 148 allows a user to search for connections based on user-assigned labels. The user-assigned labels may be assigned by users when connections are provisioned, altered, etc.

A protection type search field 150 allows a user to search for connections based on the type of protection provided for a connection. Protection schemes may be assigned to connections using a protection setup tool. The protection type search field 150 may be associated with a drop down menu that allows a user to select protection types from a predefined list. The different types of protection used may be stored in storage medium 31 to populate the drop down list.

The search criteria presented in FIG. 5 and discussed are exemplary. It is understood that a number of different search criteria may be utilized to facilitate location of cross connections.

Once the user has entered search criteria in one or more search fields, the user selects the search icon 152 to initiate the cross connection search. User system 30 searches a database of cross connections stored in storage medium 31 for cross connections meeting the search criteria. As described above, cross connect configuration data from memory device 28 may be copied into storage medium 31. The cross connect configuration data includes connection rates, port identifiers, connection type, connection labels and protection types. The user system 30 retrieves connections meeting the search criteria.

The retrieved cross connections are presented in a results table 154. The user may retrieve detailed information concerning the cross connections in result table 154 by selecting a detail tab 156. This causes the user interface application to retrieve information concerning retrieved cross connections from storage medium 31 and display the detailed information to the user.

Figure 6:
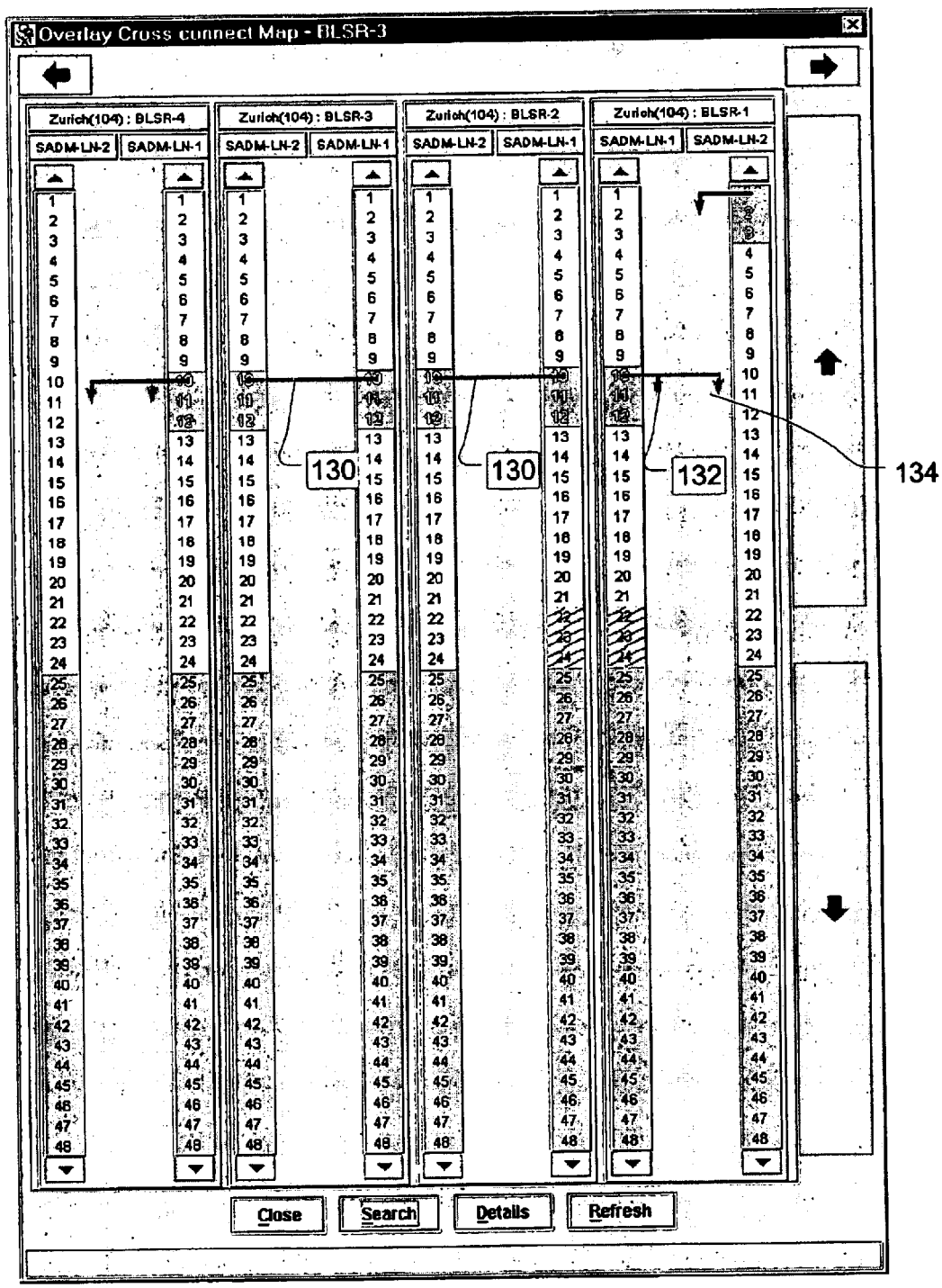
FIG. 6 depicts an exemplary user interface highlighting a cross connection retrieved through the search interface.

The user may also select a display icon 158 to view a retrieved cross connection from the result table in a graphical format such as that shown in FIG. 6. The user system 30 determines the time slots from each port needed to display the connection and positions those time slots for viewing. For example, assume a time slot interchange occurs and a connection is made between east port time slot 1 and west port time slot 192. The user system 30 shifts the west port time slots so that west port time slot 192 is displayed in the same view as east port time slot 1. The retrieved connection may be shown along with other connections on neighboring time slots. The retrieved cross connection may be designated by a connection line 130, tributary connection designator 132 and protection connection designator 134 having a different color or a different format (e.g., dotted line).

Figure 7:
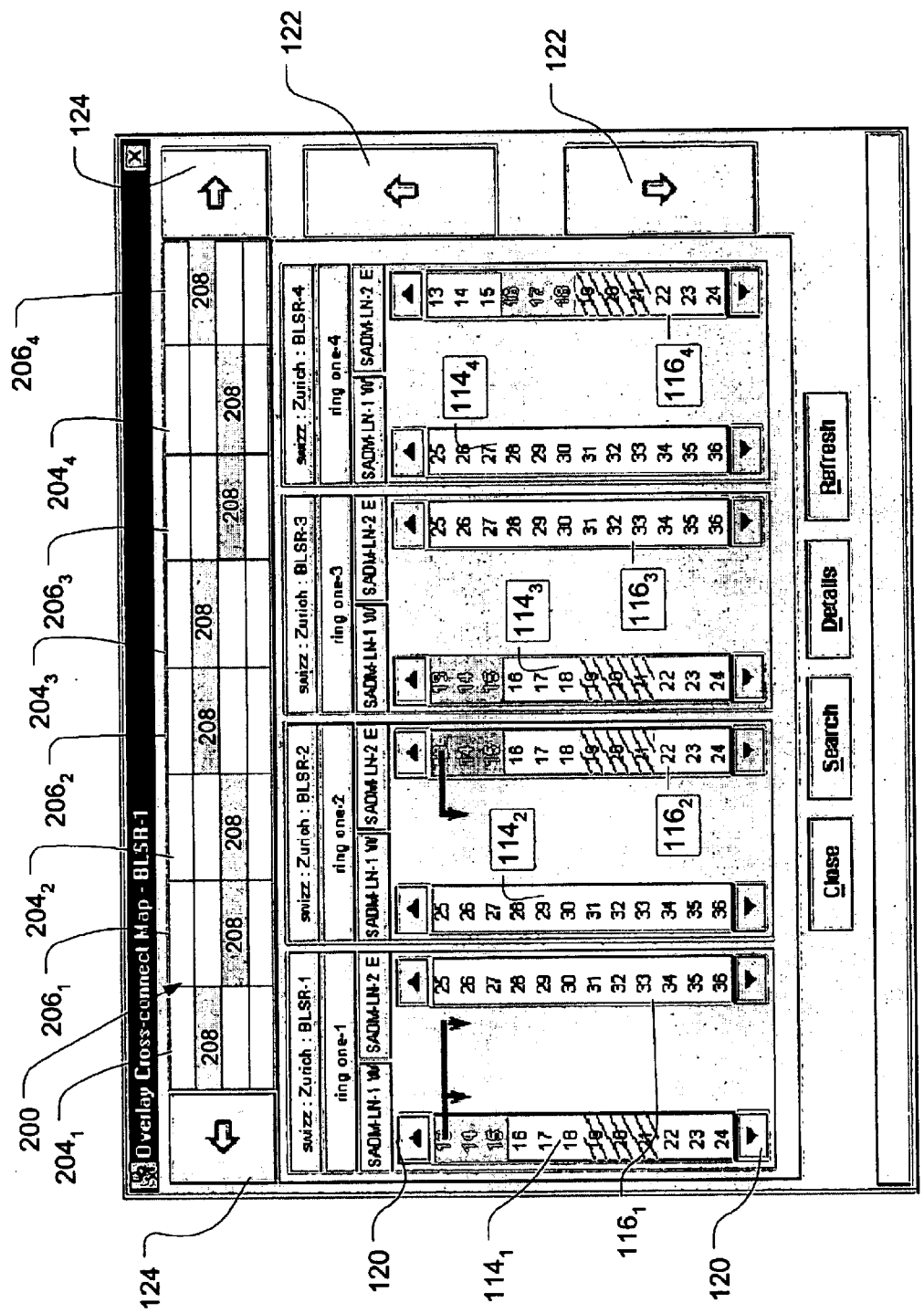
FIG. 7 depicts an exemplary user interface including a navigation grid in an alternate embodiment.

FIG. 7 depicts a user interface in an alternate embodiment. The user interface of FIG. 7 includes a navigation grid 200 that facilitates viewing time slots. Each of the sets of times slots is associated with a time slot navigation column 204 or 206. For example, east port time slots $114_1$ are associated with navigation column $204_1$. Each set of time slots is divided into time slot subgroups. For example, there are 48 east port time slots $114_1$ that are divided into 4 subgroups of 12 time slots per subgroup. Each navigation column 204/206 has a number of rows corresponding to the number of time slot subgroups. A subgroup indicator 208 is positioned in each navigation column 204/206 corresponding to the subgroup of time slots being currently being viewed. For example, time slots 13–24 (i.e., the second subgroup of time slots) of east port time slots $114_1$ are in view. The subgroup indicator 208 is positioned in row 2 of navigation column $204_1$.

The navigation grid 200 provides the user with a quick reference as to what subgroups of time slots are being viewed. This becomes particularly useful when the number of time slots increases (e.g., 192 time slots at the OC-192 level or more time slots at higher levels). Subgroups of time slots may be brought into view by selecting a row within a navigation column 204/206.

The user interface application may access other tools related to communication network 10. For example, selecting a cross connect identifier 102 may cause the user system 30 to launch a cross connect user interface. Such a cross connect user interface is described in co-pending U.S. patent application filed concurrently herewith, referenced as attorney docket number 04-660. The cross connect user interface described herein and related tools may use a common rendering scheme to provide a consistent look across multiple tools.

The terms "east" and "west" as used herein are not intended to define to specific directions of communication, but rather serve to distinguish different ports in the system. Terms such as north/south, left/right, clockwise/counter-clockwise, upstream/downstream may similarly be used to differentiate ports.

As described above, the user interface application is implemented on a processor-based, user system. Thus, the invention may be embodied in the form of a computer program code including instructions embodied in tangible media, such as floppy diskettes, CD-ROMs, hard drives, memory or any other computer-readable storage medium, wherein, when the computer program code is loaded into and executed by a processor, the processor becomes an apparatus for practicing an embodiment of the invention. Also included may be embodiments in the form of computer program code, for example, whether stored in a storage medium, loaded into and/or executed by a processor, or as a data signal transmitted, whether a modulated carrier wave or not, over some transmission medium, such as over electrical wiring or cabling, through fiber optics, or via electromagnetic radiation, wherein, when the computer program code is loaded into and executed by a processor, the processor becomes an apparatus for practicing the embodiment of the invention. When implemented on a general-purpose microprocessor, the computer program code segments configure the microprocessor to create specific logic circuits.

Embodiments of the invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for managing connections across a plurality of cross connects of a communication network, the cross connects having an east port and a west port, the connections carrying time division multiplexed signals having a number of time slots, the method comprising:
    obtaining cross connect configuration data including the relative position of cross connects in the communication network and connections between cross connects;
    displaying west port time slots for a first cross connect adjacent to east port time slots of a second cross connect;
    graphically distinguishing the west port time slots assigned to a line connection; and
    graphically distinguishing the east port time slots assigned to the line connection.

2. The method of claim 1 wherein:
    said obtaining cross connect configuration data includes at least one cross connect executing a neighbor discovery process.

3. The method of claim 1 further comprising:
    displaying a pass through connection between east port time slots of the first cross connect and west port time slots of the first cross connect.

4. The method of claim 1 further comprising:
    displaying a working connection designator coupled to at least one time slot.

5. The method of claim 1 further comprising:
    displaying a protection connection designator coupled to at least one time slot.

6. The method of claim 1 further comprising:
    displaying a scroll button associated with the west port time slots, wherein selection of the scroll button alters the west port time slots being displayed.

7. The method of claim 1 further comprising:
    displaying a consolidated scroll button associated with the west port time slots and the east port time slots, wherein selection of the consolidated scroll button alters the west port time slots and the east port time slots being displayed for a plurality of cross connects including the first and second cross connects.

8. The method of claim 1 further comprising:
    displaying a rotation button wherein selection of the rotation button shifts the display of the first and second cross connects.

9. The method of claim 1 further comprising:
    receiving search criteria from a user;
    retrieving from the cross connect configuration data connections matching the search criteria to define retrieved connections;
    receiving a request from the user to display at least one retrieved connection; and
    displaying the at least one retrieved connection.

10. The method of claim 9 wherein:
    the west port time slots are divided into a plurality of first subgroups of time slots and the east port time slots are divided into a plurality of second subgroups of time slots;
    said displaying the at least one received connection includes displaying one of the first subgroups of time slots containing the retrieved connection and displaying one of the second subgroups of time slots containing the retrieved connection.

11. The method of claim 1 further comprising:
    dividing the west port time slots of the first cross connect into a plurality of first subgroups of time slots;
    dividing the east port time slots of the second cross connect into a plurality of second subgroups of time slots;
    displaying a navigation grid having a first navigation indicator representing which of the first subgroups of time slots is displayed and a second navigation indicator representing which of the second subgroups of time slots is displayed.

12. The method of claim 11 wherein:
    the navigation grid includes a column corresponding to the west port time slots of the first cross connect, the column divided into rows, each row corresponding to one of the plurality of first subgroups of time slots;
    wherein selecting a row in the column brings the corresponding first subgroup of time slots into view.

13. A system for managing connections across a plurality of cross connects of a communication network, the connections carrying time division multiplexed signals having a number of time slots, the system comprising:
    a first cross connect having an east port and a west port;
    a second cross connect having an east port and a west port;
    a user system in communication with at least one of said first cross connect and said second cross connect, said user system:
    obtaining cross connect configuration data including the relative position of said first cross connect and said second cross connect in the communication network and connections between said first cross connect and said second cross connect;
    displaying west port time slots of said first cross connect adjacent to east port time slots of said second cross connect;

graphically distinguishing the west port time slots assigned to a line connection; and graphically distinguishing the east port time slots assigned to the line connection.

14. The system of claim 13 wherein:

said user system obtaining cross connect configuration data includes one of said first cross connect and said second cross connect executing a neighbor discovery process.

15. The system of claim 13 wherein:

said user system displays a pass through connection between east port time slots of said first cross connect and west port time slots of said first cross connect.

16. The system of claim 13 wherein:

said user system displays a working connection designator coupled to at least one time slot.

17. The system of claim 13 wherein:

said user system displays a protection connection designator coupled to at least one time slot.

18. The system of claim 13 wherein:

said user system displays a scroll button associated with the west port time slots, wherein selection of the scroll button alters the west port time slots being displayed.

19. The system of claim 13 wherein:

said user system displays a consolidated scroll button associated with the west port time slots and the east port time slots, wherein selection of the consolidated scroll button alters the west port time slots and the east port time slots being displayed for a plurality of cross connects including said first and second cross connects.

20. The system of claim 13 wherein:

said user system displays a rotation button wherein selection of the rotation button shifts the display of the first and second cross connects.

21. The system of claim 13 wherein:

said user system receives search criteria;

said user system retrieves from the cross connect configuration data connections matching the search criteria to define retrieved connections;

said user system receives a request to display at least one retrieved connection; and said user system displays the at least one retrieved connection.

22. The system of claim 21 wherein:

said user system divides the west port time slots into a plurality of first subgroups of time slots and the east port time slots into a plurality of second subgroups of time slots;

said user system displaying the at least one received connection includes displaying one of the first subgroups of time slots containing the retrieved connection and displaying one of the second subgroups of time slots containing the retrieved connection.

23. The system of claim 13 wherein:

said user system divides the west port time slots of said first cross connect into a plurality of first subgroups of time slots;

said user system divides the east port time slots of said second cross connect into a plurality of second subgroups of time slots;

said user system displaying a navigation grid having a first navigation indicator representing which of the first subgroups of time slots is displayed and a second navigation indicator representing which of the second subgroups of time slots is displayed.

24. The system of claim 23 wherein:

the navigation grid includes a column corresponding to the west port time slots of the first cross connect, the column divided into rows, each row corresponding to one of the plurality of first subgroups of time slots;

wherein said user system brings the corresponding first subgroup of time slots into view upon selection of one of the rows.

* * * * *